United States Patent
Kachare et al.

(10) Patent No.: US 10,761,775 B2
(45) Date of Patent: Sep. 1, 2020

(54) SYSTEM AND METHOD FOR NVME INTER COMMAND ASSOCIATION IN SSD STORAGE USING A BRIDGE DEVICE

(71) Applicant: Samsung Electronics Co., Ltd., Suwon-si, Gyeonggi-do (KR)

(72) Inventors: Ramdas P. Kachare, Pleasanton, CA (US); Oscar P. Pinto, San Jose, CA (US); Xuebin Yao, San Diego, CA (US); Wentao Wu, Milpitas, CA (US); Stephen G. Fischer, San Jose, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 16/107,969

(22) Filed: Aug. 21, 2018

(65) Prior Publication Data

US 2019/0250855 A1    Aug. 15, 2019

Related U.S. Application Data

(60) Provisional application No. 62/628,838, filed on Feb. 9, 2018.

(51) Int. Cl.
  *G06F 3/06* (2006.01)
(52) U.S. Cl.
  CPC .......... *G06F 3/0659* (2013.01); *G06F 3/0604* (2013.01); *G06F 3/0658* (2013.01); *G06F 3/0679* (2013.01)
(58) Field of Classification Search
  CPC .... G06F 3/0659; G06F 3/0658; G06F 3/0679; G06F 3/0604; G06F 3/061; G06F 12/0246

USPC .............. 711/154; 710/5, 306, 313; 709/212
See application file for complete search history.

(56) References Cited

U.S. PATENT DOCUMENTS

| | | | |
|---|---|---|---|
| 9,760,314 B2 | 9/2017 | Totolos et al. | |
| 9,785,356 B2 | 10/2017 | Huang | |
| 9,996,262 B1 * | 6/2018 | Nemawarkar | ...... G06F 11/3089 |
| 10,282,103 B1 * | 5/2019 | Stone | ...... G06F 3/0659 |
| 2017/0123729 A1 | 5/2017 | Watanabe | |
| 2017/0147516 A1 | 5/2017 | De | |
| 2017/0177216 A1 | 6/2017 | Freyensee et al. | |

(Continued)

FOREIGN PATENT DOCUMENTS

WO    WO 2016/196766 A2    12/2016

*Primary Examiner* — Hong C Kim
(74) *Attorney, Agent, or Firm* — Lewis Roca Rothgerber Christie LLP

(57) ABSTRACT

According to some example embodiments, a method includes receiving, a first command from a host device; determining, if the first command is part of an association group of commands by determining a first value of a first parameter of the first command in an association context table entry is greater than zero, the first parameter including a total number of commands in the association group of commands; determining, a first value of a second parameter of the first command, the second parameter including a tag value identifying the association group of commands; decrementing, the first value of the first parameter of the first command in the association context table entry; determining, if the first value of the first parameter in the association context table entry is zero; and executing, an action indicated in a third parameter of the first command.

20 Claims, 9 Drawing Sheets

(56) References Cited

U.S. PATENT DOCUMENTS

2017/0286205 A1* 10/2017 Jeong ................. G06F 11/3034
2019/0108158 A1* 4/2019 Kachare ............... G06F 3/0659

* cited by examiner

| AAction | Comment |
|---|---|
| 0x0 | No action |
| 0x1 | Commit FTL LBA-to-Physical address mapping only after all the commands are executed |
| 0x2 | Store data together |
| 0x3 | Execute commands as per the "Execution Sequence Number" embedded in each command |
| 0x4 thru 0xFF | Reserved |

FIG. 4

| Valid | ATag | ASize | AAction | Status | Other |
|-------|------|-------|---------|--------|-------|
| 0 |  |  |  |  |  |
| 1 | 1234 | 15 | 1 |  |  |
| 0 |  |  |  |  |  |
| 0 |  |  |  |  |  |
| 0 |  |  |  |  |  |
| 1 | 3821 | 3 | 2 |  |  |
|  |  |  |  |  |  |
|  |  |  |  |  |  |
| 0 |  |  |  |  |  |
| 0 |  |  |  |  |  |
| 0 |  |  |  |  |  |
| 0 |  |  |  |  |  |

SYSTEM AND METHOD FOR NVME INTER COMMAND ASSOCIATION IN SSD STORAGE USING A BRIDGE DEVICE

CROSS-REFERENCE TO RELATED APPLICATION(S)

The present application claims priority to and the benefit of U.S. Provisional Patent Application Ser. No. 62/628,838, filed Feb. 9, 2018 and entitled "A NOVEL METHOD FOR NVME INTER COMMAND ASSOCIATION IN SSD STORAGE," the entire content of which is hereby expressly incorporated by reference.

FIELD

One or more aspects of embodiments according to the present invention relate to solid state drive (SSD) storage, for example, a system and method for non-volatile memory (NVM) express (NVMe) inter command association in SSD storage.

BACKGROUND

NVMe is a standard that defines a register-level interface for host software to communicate with a non-volatile memory subsystem (e.g., a SSD) over a peripheral component interconnect express (PCIe) bus. NVMe is an alternative to the Small Computer System Interface (SCSI) standard for connecting and transferring data between a host and a peripheral target storage device or system. PCIe-connected NVMe SSDs allow applications to communicate directly to storage.

The above information disclosed in this Background section is only for enhancement of understanding of the background of the invention and therefore it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a system and method for NVMe inter command association in SSD storage.

According to some example embodiments according to the present disclosure, a method includes receiving, at a storage controller, a first command from a host device; determining, at the storage controller, if the first command is part of an association group of commands by determining a first value of a first parameter of the first command in an association context table entry is greater than zero, the first parameter includes a total number of commands in the association group of commands; determining, at the storage controller, based on determining the first value of the first parameter of the first command in the association context table entry is greater than zero, a first value of a second parameter of the first command, the second parameter including a tag value identifying the association group of commands; decrementing, by the storage controller, the first value of the first parameter of the first command in the association context table entry; determining, by the storage controller, if the first value of the first parameter in the association context table entry is zero; and executing, by the storage controller, based on determining the first value of the first parameter in the association context table entry is zero, an action indicated in a third parameter of the first command.

According to some example embodiments, the storage controller is associated with a storage device, where the storage device is a solid state drive (SSD) and the host device is a storage server. According to some example embodiments, the first parameter of the first command is an association size (ASize) parameter, the second parameter of the first command is an association tag (ATag) parameter, and the third parameter of the first command is an association action (AAction) parameter. According to some example embodiments, all commands in the association group of commands have same ATag value. According to some example embodiments, AAction indicates a predefined action that the storage controller performs on all commands in the association group of commands. According to some example embodiments, zero value of the first parameter in the association context table entry indicates an end of the association group of commands.

According to some example embodiments, the method further includes storing, by the storage controller, in the association context table in a storage device associated with the storage controller, the first value of the first parameter, the first value of the second parameter, and a first value of the third parameter of the first command. According to some example embodiments, if the first value of the first parameter in the association context table entry is not zero, the method further includes receiving, at the storage controller, a second command from the host device; determining, at the storage controller, if the second command is part of the association group of commands by determining a second value of the first parameter of the second command in the association context table entry is greater than zero and a second value of the second parameter of the second command is same as the first value of the second parameter of the first command; decrementing, by the storage controller, the second value of the first parameter of the second command in the association context table entry; determining, by the storage controller, if the second value of the first parameter of the second command in the association context table entry is zero; and executing, by the storage controller, based on determining the second value of the first parameter of the second command in the association context table entry is zero, an action indicated in the third parameter of the second command.

According to some example embodiments, the method further includes storing, by the storage controller, a data containing results from executing the action indicated in the third parameter of the first command, in a physical location in a storage device associated with the storage controller.

According to some example embodiments, a system includes a host device; a bridge device connected to the host device at a first end of the bridge device; and a storage device connected to the bridge device at a second end of the bridge device, where the bridge device is configured to: receive a first command from the host device; collect, from the host device, data related to the first command; generate one or more second commands based on the first command received from the host device and the data related to the first command; and transfer the one or more second commands to the storage device.

According to some example embodiments, the host device is a storage server and the storage device is a solid state drive (SSD). According to some example embodiments, the bridge device generates the one or more second commands by dividing the first command received from the host device in a plurality of commands. According to some example embodiments, the bridge device individually transfers each command of the plurality of commands to the storage device and where the bridge device is further configured to receive an indication from the storage device when execution of the one or more second commands is completed at the storage device.

According to some example embodiments, in response to receiving the indication from the storage device, the bridge device is further configured to generate and transmit an indication to the host device that the execution of the one or more second commands are completed at the storage device. According to some example embodiments, the plurality of commands is associated with each other and belongs to an association group of commands and where the bridge device inserts an association tag (ATag) and an association size (ASize) or a total number of commands in the association group of commands in each of the plurality of commands, where the ATag is same for all the commands in the association group of commands.

According to some example embodiments, the plurality of commands in the association group of commands form a linked list by each command in the association group of commands including at least a Command Identifier (CID) and/or a Submission Queue Id (SQID) to identify next command in the linked list to be executed by the storage device, where a last command in the linked list carries one or more fixed values reserved to indicate an end of the linked list. According to some example embodiments, the bridge device is further configured to create a Command Identifier (CID) and a Submission Queue Identifier (SQID) tuple entries in a host memory buffer and send an address of the host memory buffer to a controller in the storage device in a third command, where the controller in the storage device receives command association group information during execution of the third command, and where the bridge device submits the plurality of commands in the association group of commands once the controller in the storage device completes execution of the third command.

According to some example embodiments, the bridge device collects the data related to the first command at a memory in the bridge device. According to some example embodiments, the first command from the host device is a non-volatile memory (NVM) express (NVMe) or an NVMe over fabric (NVMe-oF) command.

According to some example embodiments, a method includes receiving, at a bridge device, a first command from a host device; collecting, from the host device, data related to the first command; generating, by the bridge device, an association group of commands including a plurality of commands by dividing the first command received from the host device in the plurality of commands; inserting, by the bridge device, an association tag (ATag) and an association size (ASize) or a total number of commands in the association group of commands in each of the plurality of commands, where the ATag is same for all the commands in the association group of commands; and individually transferring, by the bridge device, each command of the plurality of commands to a storage device.

BRIEF DESCRIPTION OF THE DRAWINGS

These and other features of some example embodiments of the present invention will be appreciated and understood with reference to the specification, claims, and appended drawings, wherein:

FIG. 4 illustrates an example of an association action (AAction) field encoding, according to some example embodiments of the present invention;

FIG. 7 illustrates an example of an association context table maintained by a SSD controller, according to some example embodiments of the present invention;

DETAILED DESCRIPTION

Figure 1:
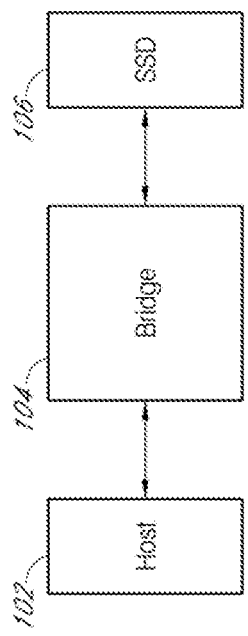
FIG. 1 illustrates a system, according to some example embodiments of the present invention.

The detailed description set forth below in connection with the appended drawings is intended as a description of some example embodiments of a system and method for NVMe inter command association in SSD storage provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

NVMe is a standard that defines a register-level interface for host software to communicate with a non-volatile memory subsystem (e.g., a SSD) over a PCIe bus. NVMe is an alternative to the Small Computer System Interface (SCSI) standard for connecting and transferring data between a host and a peripheral target storage device or system. PCIe-connected NVMe SSDs allow applications to communicate directly to storage.

The physical connection of the NVMe is based on a PCIe bus. A typical Ethernet SSD (eSSD) has a standard SSD (e.g. U.2) connector to interface with a system via a mid-plane over the PCIe bus. U.2 (SFF-8639) is a computer interface for connecting SSDs to a computer. A U.2 connector can support either two Serial Advanced Technology Attachment (SATA) or Serial Attached SCSI (SAS) ports and up to four lanes (×4) of parallel I/O in PCIe SSDs. If unused, the two PCIe lanes 1 and 2 may be optionally used as additional SAS ports if required. The U.2 connector is standardized for NVMe and supports PCIe 3.0×4, providing five times the speed of a typical SATA SSD.

NVMe over fabric (NVMe-oF) is an extension to the NVMe standard enabling operation over a variety of fabrics (or interconnects) other than PCIe. Herein, the term "fabric", represents a network topology in which network nodes can pass data to each other through a variety of interconnecting protocols, ports, and switches. For example, Ethernet-attached SSDs may attach directly to a fabric, and in this case the fabric is the Ethernet.

NVMe-oF enables the use of alternate transports to PCIe that extend the distances across which an NVMe host device and NVMe storage drive or subsystem can connect. Therefore, NVMe-oF is a technology specification designed to enable nonvolatile memory express message-based commands to transfer data directly between a host computer and a target solid-state storage device (e.g., eSSD or NVMe-oF device) or system over a network, such as Ethernet, Fibre Channel (FC) or InfiniBand. When configured to support the NVMe-oF standard, a system can support various fabrics including not only Ethernet, but also, Fibre Channel, InfiniBand, TCP/IP, and other network fabrics. For example, eSSDs may attach directly to a fabric, and in this case the fabric is the Ethernet. An eSSD may refer to an SSD that may support the NVMe-oF protocols.

FIG. 1 illustrates a system 100 including a host device 102, a bridge device 104, and a SSD 106, where the bridge device 104 sits between the host device and the SSD 106. The SSD 106 may store host 102 (e.g., "storage server" or "storage server host") data or user data in NAND flash media which may include a plurality of flash media. Host device 102 may access the stored data in the SSD 106 using logical block addresses (LBAs). In some example embodiments, a SSD controller (described in more detail below, for example, with respect to FIG. 6) may manage the flash media in the SSD 106 and may provide access to the data stored in the SSD 106 to the host device 102. The SSD controller may be a processing circuit and may provide a storage interface using host interface protocols such as NVMe and NVMe-oF to communicate with the SSD 106.

In some examples, an NVMe driver running on the host device 102 may issue NVMe read and write commands to perform user data accesses. NVMe protocol may allow driver to send commands to the SSD 106 and may allow SSD 106 to perform actual data direct memory access (DMA) operations. For write commands, once the user data is fetched from the memory of the host 102 device, the SSD controller may program that data into the flash media of the SSD 106. Flash media has certain unique characteristics related to the way data is written/programmed into it. For example, in the plurality of flash media of the SSD 106, the data may be programmed only into an erased block, as the flash media does not allow in-place data modification. Therefore, when a data is overwritten or modified by applications running on the host device 102, SSD controller may program a newly modified data for the associated LBAs into a fresh, erased location in the flash media, and may update the logical-to-physical mapping tables to reflect new data corresponding to the original LBAs. In some examples, SSD controller maintains a mapping between LBA and physical address in the SSD 106. Typically, a physical address in the flash media of the SSD 106 is composed of flash block and page numbers. Once a new or newly modified data is written to the flash, SSD controller sends a command completion back to the host device 102. The SSD controller subsequently updates the new logical-to-physical translation in the mapping table.

In one example, when an application writes a file or data object that is bigger than the maximum data transfer size (MDTS) supported by the SSD 106, the NVMe driver of the host device 102 may split the original data into multiple chunks and may send the chunks of the original data to the SSD 106 by independent NVMe write commands. In such a case, the host device 102 and the software stack may have additional burden of keeping track of success or failure of the individual chunks of the original data. The example embodiments of the present disclosure may relieve the host device 102 from the burden of keeping track of success or failure of the individual chunks of the original data and transfer such responsibility to SSD 106.

Figure 2:
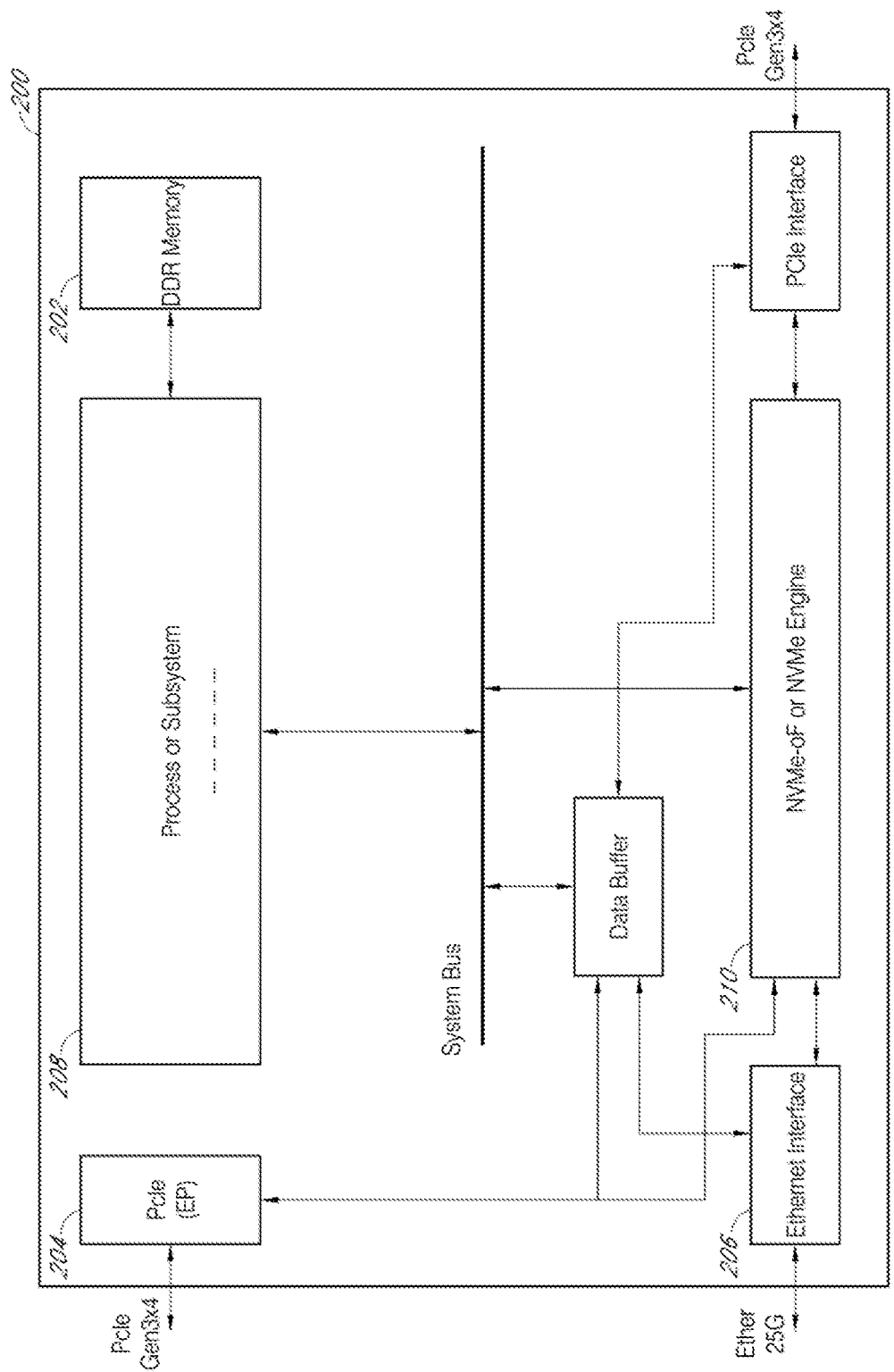
FIG. 2 illustrates an example architecture of a bridge device, according to some example embodiments of the present invention.

FIG. 2 illustrates example architecture of an NVMe or NVMe-oF bridge device 200 that sits between a local or remote host and a backend SSD. In the example embodiment of FIG. 2, the bridge device 200 may be the bridge device 104 of FIG. 1.

NVMe or NVMe-oF bridge device 200 sits in front of one or more backend SSDs (for example, SSD 106). NVMe or NVMe-oF bridge device 200 may receive NVMe read or write commands from the host device (e.g., host device 102) at PCIe end point (EP) 204 or NVMe-oF read or write commands from the host device (e.g., host device 102) at Ethernet interface 206. The NVMe or NVMe-oF bridge device 200 may translates and executes those commands to the backend SSD (e.g., SSD 106) using the processor subsystem 208 and NVMe or NVMe-oF engine 210. When the bridge device 200 receives an NVMe write command, the bridge device 200 starts fetching data from the host device (e.g., host device 102) in some optimal chunk sizes. As the data chunks are fetched from the host device (e.g., host device 102), the bridge device 200 may initiate writing of those fetched data chunks by issuing NVMe write commands for the data chunks to the backend SSD (e.g., SSD 106). When all the data chunks are fetched from the host device (e.g., host device 102) and written to the backend SSD (e.g., SSD 106), the bridge device 200 may send a completion entry to the host device (e.g., host device 102) for the original write command. During this process, if one or more data chunk write operations to the backend SSD (e.g., SSD 106) fail, the bridge device 200 may fail the original host write command and may send an error status in the completion entry to the host device (e.g., host device 102). However, in such a situation, the backend SSD (e.g., SSD 106) may have already written one or more data chunks and performed the new logical-to-physical address mapping in the flash translation layer (FTL) of the SSD controller. Therefore, the failed write command may modify or corrupt the original data, which may not be an acceptable SSD behavior for some applications.

In order to avoid the corruption of original data in the SSD by a failed write command, some example embodiments of the present disclosure may inform the backend SSDs (e.g., SSD 106) that certain set of NVMe write commands are part of a single original write command, which may be called an NVMe command association reporting mechanism. In some example embodiments, an association between a set of independent NVMe write commands being indicated to the SSD (e.g., SSD 106) may help the SSD to be refrained from mapping the new logical-to-physical addresses in the FTL until all the member commands of the association group are successfully completed. The association between a set of independent NVMe write commands may be useful to support atomicity of write commands to enable the host write commands to either write the whole new data or not to write any data. In other words, indication of an association between a set of independent NVMe write commands to the SSD may be useful to avoid partially modified original data in the SSD due to a failed write command to an NVMe or NVME-oF bridge device 200.

In some example embodiments, the NVMe command association reporting mechanism may be utilized for other operations, such as, Quality of service (QoS), differentiated processing, etc. In some other example embodiments, the NVMe command association reporting mechanism may be utilized by NVMe driver of the host device (e.g., host device 102).

In some example embodiments, the bridge device 200 may have a store-and-forward architecture or a cut-through architecture. In case of store-and-forward architecture, the bridge device 200 first fetches the complete data for a given command into the bridge device 200 memory, for example, the DDR memory 202, and then the bridge device 200 issues another command to the backend SSD (e.g., SSD 106). For example, in store-and-forward architecture, the entire host data for a write command is fetched to the bridge device 200 and then a single NVMe write command is issued from the bridge device 200 to the backend SSD (e.g., SSD 106). In store-and-forward architecture, there may not be any need to segment an original host command into smaller chunks. Also, in store-and-forward architecture, additional latency is incurred as whole data for a command is gathered at the bridge device 200. Some example embodiments may lead to higher resource utilization such as memory, power, and processing cycles.

Figure 3:
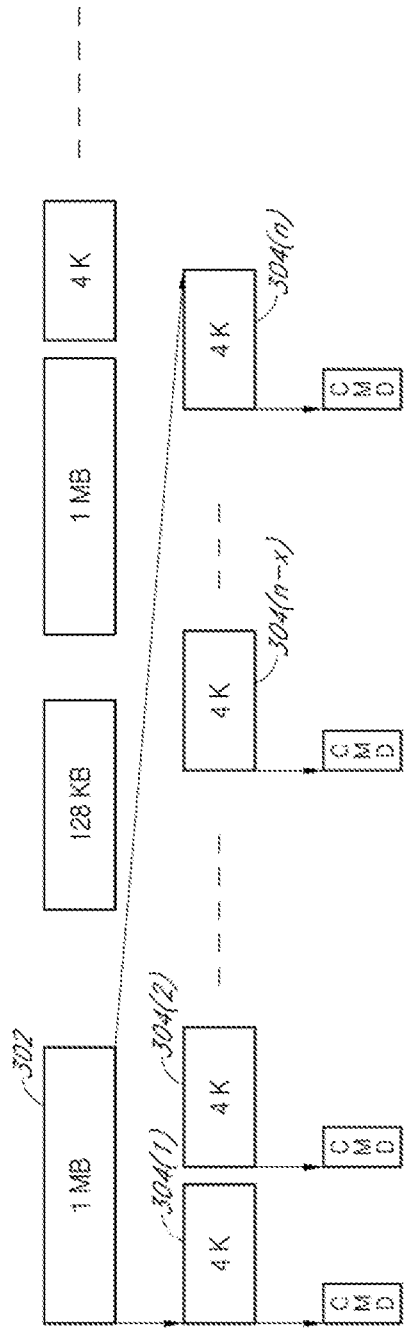
FIG. 3 illustrates the structure of an NVMe command in the cut-through bridge architecture, according to some example embodiments of the present invention.

FIG. 3 illustrates the structure of an NVMe command in the cut-through bridge architecture. In cut-through architecture, the bridge device 200 may chop an original host NVMe or NVMe-Of command, for example, 1 MB command 302, into a plurality of smaller NVMe sub-commands 304(1), 304(2), . . . , 304(n-x), . . . , and 304(n). The bridge device 200 may send each individual sub-command, for example, 304(1), 304(2), . . . , 304(n-x), . . . , and 304(n), to the backend SSD. The backend SSD (e.g., SSD 106) may receive the NVMe sub-commands, for example, 304(1), 304(2), . . . , 304(n-x), . . . , and 304(n), and may execute the NVMe sub-commands 304(1), 304(2), . . . , 304(n-x), . . . , and 304(n). In cut-through bridge architecture, the SSD controller of the backend SSD may only see the individual sub-command, for example, 304(1), 304(2), . . . , 304(n-x), . . . , and 304(n). Once executed, the backend SSD may send completion entries to the bridge device 200. The bridge device 200 keeps track of the execution of NVMe sub-commands 304(1), 304(2), . . . , 304(n-x), . . . , and 304(n), and at the end of execution of all the sub-commands, the bridge device 200 sends a completion entry for the original NVMe command 302 to the host device (e.g., host device 102).

In one example embodiment, NVMe sub-commands 304(1), 304(2), . . . , 304(n-x), . . . , and 304(n) may form a linked list, as each NVMe sub-commands 304(1), 304(2), . . . , 304(n-x), . . . , and 304(n) may carry a pointer indicating the next sub command and the last sub-command in the list may carry a tuple indicating an end of the list or association group of commands. The association tuple may include Command Identifier (CID), Submission Queue Id (SQID), and other parameters to identify the next command to be executed. The last command in the linked list may carry some fixed values reserved to indicate the end of the list. This method and mechanism can be used by a host or bridge device to specify the exact sequence of command execution by the SSD Controller. In the absence of this mechanism, normally, SSD Controller executes NVMe commands in any order it wishes.

In another embodiment a host or a bridge device may use a special NVMe command or a vendor defined command to send association group information to the SSD controller before submitting actual association group member commands. Such host or bridge device may create {Command Identifier (CID), Submission Queue Identifier (SQID)} tuple entries in a host memory buffer. The host or bridge device may then send the address of this buffer to the SSD Controller in a special NVMe command. When SSD Controller executes this special command, it would receive the command association group information. Once SSD Controller completes this special NVMe command, the host or bridge device would go ahead and submit the actual NVMe commands it intends to associate as a single group. The SSD Controller would then treat these commands as a single command association group.

Some example embodiments of the present disclosure may further enable better latency performance for bridge implementations and other optimization methods in the SSD based on the knowledge of command association. Some example embodiments may also release some workload from host, should host software utilize the method according to example embodiments.

In some configurations, a bridge device (for example, 200) or a host device (e.g., 104) may create an association group of related NVMe commands that belong together. The bridge device 200 may create the association group of related NVMe commands by using three parameters, e.g., association tag (ATag), association size (ASize), and association action (AAction), to define and indicate an association group. The bridge device 200 (or host device) may insert a special tag (ATag) and a size (ASize) or total number of commands in the association group fields of the NVMe commands in that particular association group. A backend SSD attached to the bridge device 200 may maintain a table of active ATags and corresponding ASizes. SSD tracks the active ATags and monitors how many commands from the corresponding set are executed at any given time. When the SSD executes the full set of commands in a particular association group, the SSD may perform certain actions for all the commands in the association group, such as committing mapping of the logical-to-physical address in the FTL of the SSD controller.

In one example, when a SSD that supports the command association feature, receives an NVMe command, it treats all the commands belonging to the same association group similarly. For an association group of write commands, the SSD may only commit mapping of the logical to physical address of the new or newly modified data in the FTL mapping tables when all the commands from the association group of write commands are successfully executed. The SSD may use the knowledge (ATag, ASize, and AAction) of the association group to perform various other actions to the commands in the association group, such as sequence of command execution, QoS and placement of data. Based on AAction, other reserved fields of the NVMe commands could be used to send additional parameters to the SSD Controller. For example host may send "Execution Sequence Number" embedded in each command for "AAction" that specifies execution sequence the SSD Controller should follow.

In some example embodiments, ATag may be 16 bits and a 16-bit ATag may indicate up to 64K active associations at any given time. ASize may also be 16 bits and a 16-bit ASize parameter can allow up to 64K individual commands in a given association. FIG. 4 illustrates an example of AAction field encoding. AAction field may be 8 bits and may be used to convey the predefined action that SSD controller needs to perform on the commands of that association using up to 256 unique action codes. AAction may describe actions to be performed either during the execution of the group commands or at the end of the execution of the group commands. For example, the FTL in the SSD controller may perform the logical to physical address mapping once all the associated commands are being executed based on the information "commit FTL LBA-to-physical address mapping only after all commands are executed" in the AAction field of a command. Another example of AAction could be the sequence of command execution to be followed and FTL in the SSD controller may execute the sequence of commands based on the information "execute commands as per the "Execution Sequence Number" embedded in each command" in the AAction filed of a command. Yet another example of AAction could be the execution priority of the commands from that association group.

Figure 5:
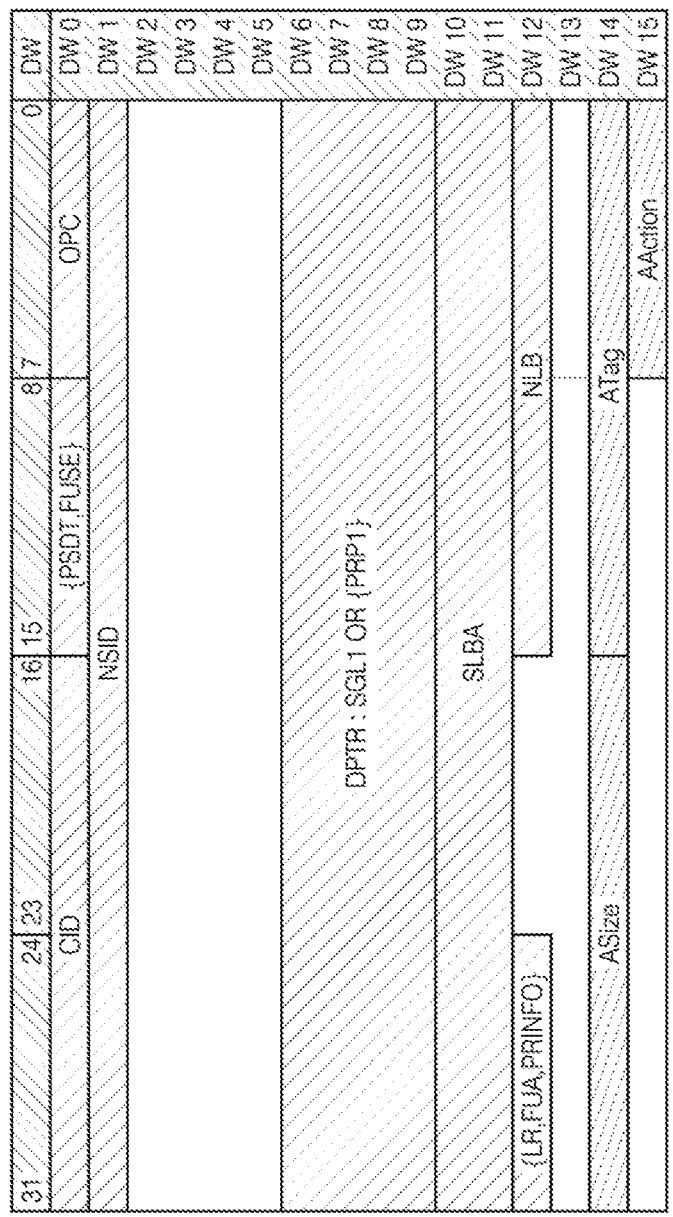
FIG. 5 illustrates an example of NVMe input output (IO) command format, according to some example embodiments of the present invention.

FIG. 5 illustrates an example of NVMe IO command format 500 that carries ASize, ATag, and AAction fields. In one example, reserved fields of NVMe commands may be used to send ATag and ASize information to the backend SSD. In one example, the NVMe IO command 500 may be 64 bytes. The 64 bytes of the NVMe IO command 500 are arranged in the 16 d-words (DW), for example, DW 0-DW 15. Each d-word may be 32 bits or four bytes. The first d-word (DW0) contains op-code (OPC). The information in OPC discloses whether the NVMe IO command 500 is an NVMe write command, read command, or some other NVMe command. The {PSDT, FUSE} in the DW0 are flags which indicates functionalities of the NVMe IO command 500. DW0 also includes a 16 bit command id (CID). In the NVMe IO command 500, DW0-DW 12 are standard fields of an NVMe IO command 500. DW 14-DW 15 are reserved fields of the NVMe IO command 500. In an example embodiment, reserved fields of NVMe commands or certain overloaded fields of the NVMe commands may be used to carry ATag, ASize, and AAction information. For example, as shown in FIG. 5, the reserved fields DW 14-DW 15 of the NVMe IO command 500 are used to carry ATag, ASize, and AAction information. In another example embodiment, ATag and ASize along with a sequence number in the commands may be used to identify the commands belonging to an association group.

Figure 6:
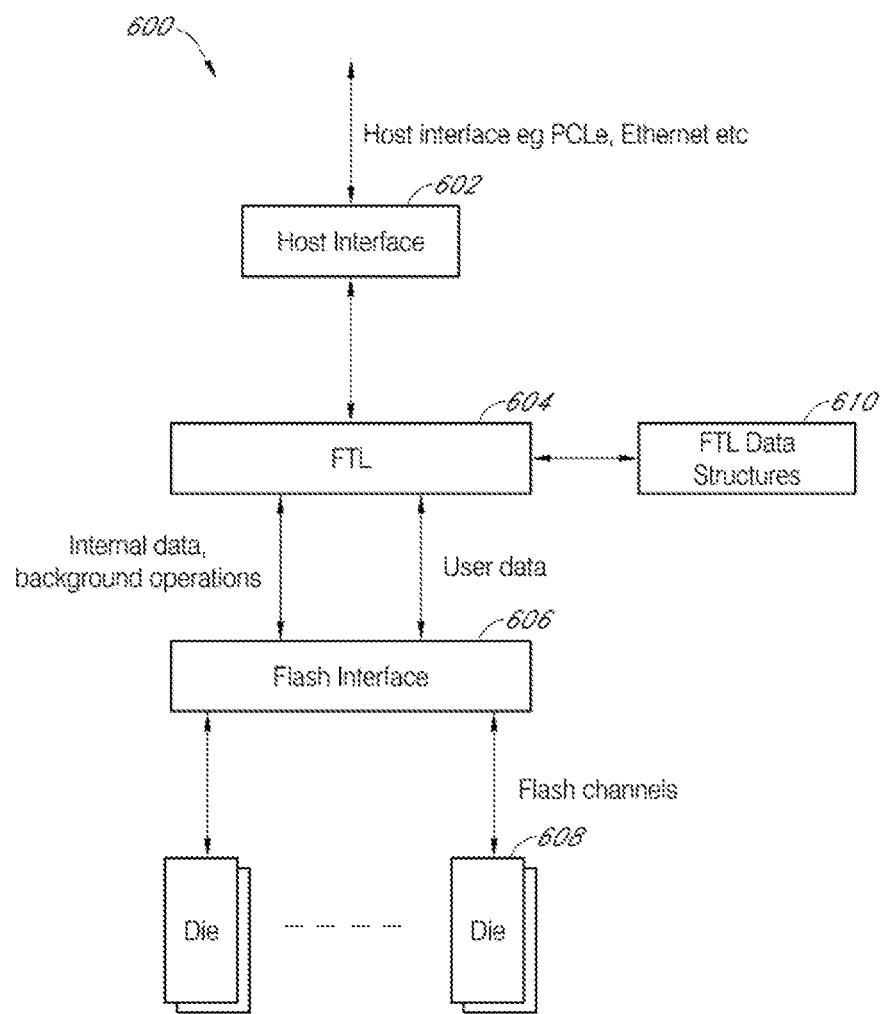
FIG. 6 illustrates a block diagram of a SSD controller, according to some example embodiments of the present invention.

FIG. 6 illustrates a block diagram of a SSD controller 600. A SSD controller manages the flash media in the SSD (e.g., SSD 106) and provides access to the data to a host device (e.g., host device 102) to which the SSD (e.g., SSD 106) is attached. The SSD controller 600 may be a processing circuit. The SSD controller 600 may include a host interface 602, e.g., through a connector and a protocol customarily used by a host device (e.g., host device 102) and storage device (e.g., SSD 106) to exchange storage commands and responses. The connector and protocol may conform to, for example, PCIe, remote direct memory access (RDMA) over Ethernet, SATA, Fibre Channel, SAS, NVMe, NVMe-oF, NVMe over TCP etc. or to a more general-purpose interface such as Ethernet or Universal Serial Bus (USB).

The host interface 602 is used by the storage server host to communicate with the SSD (e.g., SSD 106). Input output (IO) commands such as data read and data write commands, as well as various media management commands (e.g., Identify, Get Log, etc.) may be sent to the SSD (e.g., SSD 106) by the host (e.g., host device 102) over the host interface 602. The host interface 602 may be used by the SSD (e.g., SSD 106) to perform data transfers to and from storage server host (e.g., host device 102) system memory.

In one example, host interface 602 may perform command fetching, initiation of command execution, data transfers, and posting completion entries to the host (e.g., host device 102). The fetched commands are parsed, and LBA, length of data transfer, and other command fields are extracted and provided to the FTL layer 604. The FTL layer 604 performs logical address to physical address translation. In particular, the FTL layer 604 may provide a mapping between (i) logical addresses used by the storage server and (ii) physical locations of the data on the flash media. A physical address may be in the form of {flash channel, Block #, Page #, Page offset}. The physical address may be used to either fetch the data for read commands or program the data for write commands.

In some example embodiments, the FTL 604 may store internal data structures on chip or, e.g., in an off-chip dynamic random access memory (DRAM) (e.g., "FTL data structures" 610), and access to those data structures may have its own performance variations, which may also contribute to read latency variations.

A flash interface 606 performs read and write data operations on the flash media (i.e. on the flash dies 608) in the SSD (e.g., SSD 106). The flash media has protocols such as the Open NAND Flash Interface (ONFI) and Toggle to perform these operations. The flash media also has certain media specific rules and timing parameters regarding how data read and write operations are done. The flash interface 606 may also endeavor to maximize (e.g., improve) the performance, power consumption, and other operating characteristics of the flash media on the flash dies 608, and it may protect against media errors, e.g., by performing data encoding and error correction to ensure data reliability. As used herein, a "read command" is a command sent by a host (e.g., host device 102) to a storage device (e.g., SSD 106), requesting data; in response a "read operation" is an operation performed internally by the storage device (e.g., SSD 106), which may include, e.g., fetching data from flash memory media on the flash dies 606.

In some example embodiments, when a SSD controller (e.g., SSD controller 600) receives a NVMe command (e.g., NVMe command 500) with ASize field set to non-zero value (e.g., 15) for a given ATag (e.g., 1234) for the first time, the SSD controller (e.g., SSD controller 600) creates a context table (e.g., association context table 700 of FIG. 7) entry for that ATag (e.g., 1234). The SSD controller (e.g., SSD controller 600) stores the ASize value (e.g., 15) received in the command (e.g., NVMe command 500) in that context table (e.g., association context table 700 of FIG. 7). The context table (e.g., association context table 700 of FIG. 7) may be used to store any other relevant information for that group of commands. For subsequent commands with the same ATag, the counter in the context is decremented. Therefore, SSD controller 600 knows when it executes the last command from that association group. At the end of an association group, SSD controller 600 performs action indicated for that association.

In some example embodiments, the streams directive feature in NVMe enables the host to indicate to the SSD controller 600, by using the stream identifier, that the specified logical blocks in a write command are part of one group of associated data. Similarly, the command association group can be used to indicate placement of the write data to certain regions of the flash media. In some example embodiments, the NVMe spec has fused command support where fused operations enable a complex command by "fusing" together two relatively simpler commands. In some cases, when a set of commands associated with each other is received by SSD controller 600 for execution, the SSD controller 600 may treat the set of associated commands as a single command. For write command association, the SSD controller 600 may not perform the new logical-to-physical mapping until all the commands from the association set are successfully completed. SSD may use such association set property to perform other actions that are unique to that association set. For example, all the write commands in an association set can be written to a specific NVMe set or flash channel. In an another example, all the NVMe read commands from an association set may be given higher priority for execution and are executed as close to each other as possible. In yet another example, a specific compression and/or encryption algorithm can be applied to the data carried by those commands. In yet another example, the SSD controller may execute the commands in the same association group in the sequence specified by the host or the bridge device.

FIG. 7 illustrates an example of an association context table 700 maintained by a SSD controller (e.g., SSD controller 600). In an example, the association context table 700 may be dynamically created by the SSD controller (e.g., SSD controller 600). In another example, the association context table 700 may provide by lookup a free context entry and may record ATag, ASize, and AAction from the first command of a new association set in that entry. The association context table 700 may perform deallocation of the context entry, once all the commands belonging to the association set are executed. In some example, the association context table 700 may decrement ASize for every command belonging to the association set, once such command has been executed by the SSD controller. In one example, in the association context table 700, there are two active associations. The first valid association with ATag value of 1234 has 15 commands (the value of the ASize) yet to be executed while the second active and valid association group with ATag value of 3821 has 3 pending commands (the value of the corresponding ASize). SSD Controller performs association context resource management functions such as allocation of a free entry, and de-allocation at the end of association completion.

Figure 8:
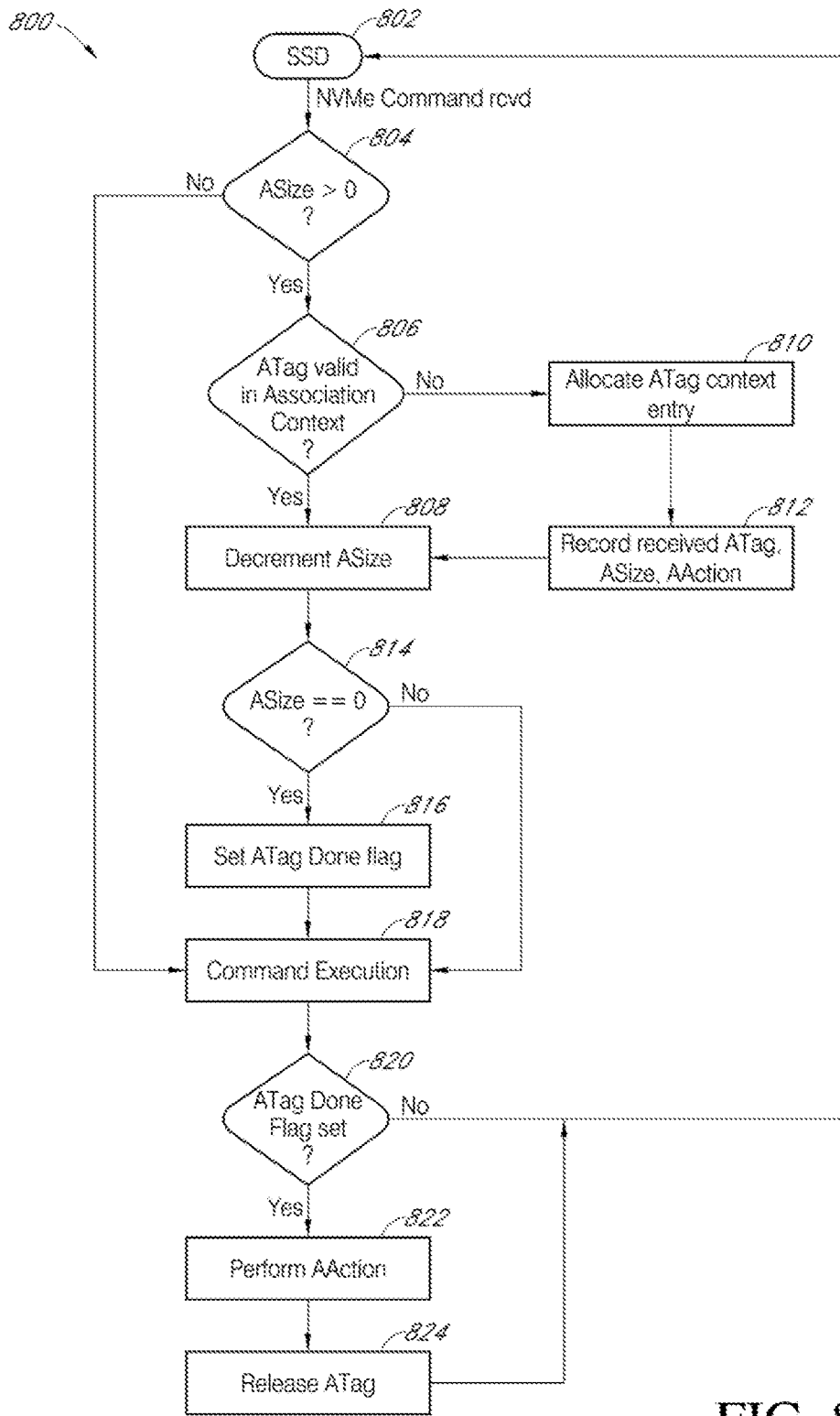
FIG. 8 illustrates an example flow chart of a method of performing an association group operation by a SSD controller, according to some example embodiments of the present invention.

FIG. 8 illustrates an example flow chart of a method 800 of performing an association group operation by a SSD controller. In the Examiner embodiment of FIG. 8, the SSD controller may be SSD controller 600 of FIG. 6.

At 802, an NVMe command (e.g., NVMe command 500) may be received at a SSD controller (e.g., SSD controller 600).

At 804, the SSD controller (e.g., SSD controller 600) determines if the "ASize" value in the received command is greater than zero.

If at 804, the SSD controller determines that the "ASize" value in the received command is greater than zero, at 806, the SSD controller determines if the "ATag" value in the received command is valid in association context (e.g., the just received command belongs to an existing (already created) association group).

For example, when a SSD controller (e.g., SSD controller 600) receives a NVMe command (e.g., NVMe command 500) with ASize field set to non-zero value (e.g., 15) for a given ATag (e.g., 1234) for the first time, the SSD controller (e.g., SSD controller 600) creates a context table (e.g., association context table 700) entry for that ATag (e.g., 1234). The SSD controller (e.g., SSD controller 600) stores the ATag (e.g., 1234), ASize (e.g., 15), and AAction (e.g., 2) received in the command in the context table (e.g., association context table 700) and sets a valid bit to indicate that that entry is now in use. The context table entry (e.g., association context table 700) may be used to store any other relevant information for that group of commands.

At 806, if the SSD controller determines that the "ATag" value in the received command is valid in association context table, (if true) it bypasses the allocation of new context table entry. At 808, the SSD controller decrements ASize field in that context entry. Therefore, SSD controller knows when it executes the last command from that association group, as the ASize entry in the context table is zero. At the end of an association group (e.g., association group with ATag 1234), the SSD controller performs action indicated for that association.

However, at 806, if the SSD controller determines that the "ATag" value in the received command is not valid in association context, at 810, the SSD controller (e.g., SSD controller 600) may allocate a context table (e.g., association context table 700) entry for that ATag (e.g., 3821).

At 812, the SSD controller (e.g., SSD controller 600) stores the ATag (e.g., 3821), ASize (e.g., 3), and AAction (e.g., 2) received in the command in the context table (e.g., association context table 700). From 812, the method returns to 808.

At 814, the SSD controller (e.g., SSD controller 600) determines if the "ASize" value in the context entry corresponding to the received command is equal to zero.

If at 814, the SSD controller (e.g., SSD controller 600) determines that the "ASize" value in the context entry for the received command is equal to zero, which indicates that the last command from that particular association group (e.g., association group with ATag 1234) is being executed, at 816, the SSD controller sets "the done flag for the context entry corresponding to the received ATag.

However, if at 814, the SSD controller determines that the "ASize" value of the received command, as found in the corresponding context entry, is not equal to zero, the method 800 proceeds to 818. Also, if at 804, the SSD controller determines that the "ASize" value in the received command is not greater than zero, the method 800 proceeds to 818.

At 818, the SSD controller (e.g., SSD controller 600) performs command execution. In some example embodiments, command execution may refer to normal NVMe command execution, in which the operations indicated by OPC filed of the command may be performed. For example, for a Write command, command may be fetched from the host, data may be fetched from the host and written to the flash media, completion entry may be sent to the host, and interrupt may be generated to the host. AAction may not be performed at this stage.

At 820, the SSD controller (e.g., SSD controller 600) determines if the ATag done flag is set, which may indicate an end of an association group (e.g., association group with ATag 1234).

At 820, if the SSD controller determines that the ATag done flag for a particular association group of commands is set, which may indicate an end of an association group (since the ASize is zero and done flag is set for that ATag), at 822, the SSD controller may perform action indicated for that association group in the AAction. For example, at the end of an association group with ATag value of 1234, when the ASize is zero and done flag is set, the SSD controller 600 performs action indicated by AAction value 1 for association group with ATag value of 1234 in the association table 700.

However, at 820, if the SSD controller (e.g., SSD controller 600) determines that the ATag done flag for a particular association group of commands is not set, the method 800 returns to 802.

At 824, the SSD controller (e.g., SSD controller 600) may release ATag.

Once all commands in an association group of commands (e.g., association group with ATag 1234) have been executed successfully by the SSD controller (e.g., SSD controller 600), the FTL (e.g., FTL 604) may commit a mapping between the logical addresses used by the host device (e.g., host device 102) and the physical locations of the data on the flash media (e.g., 608).

Figure 9:
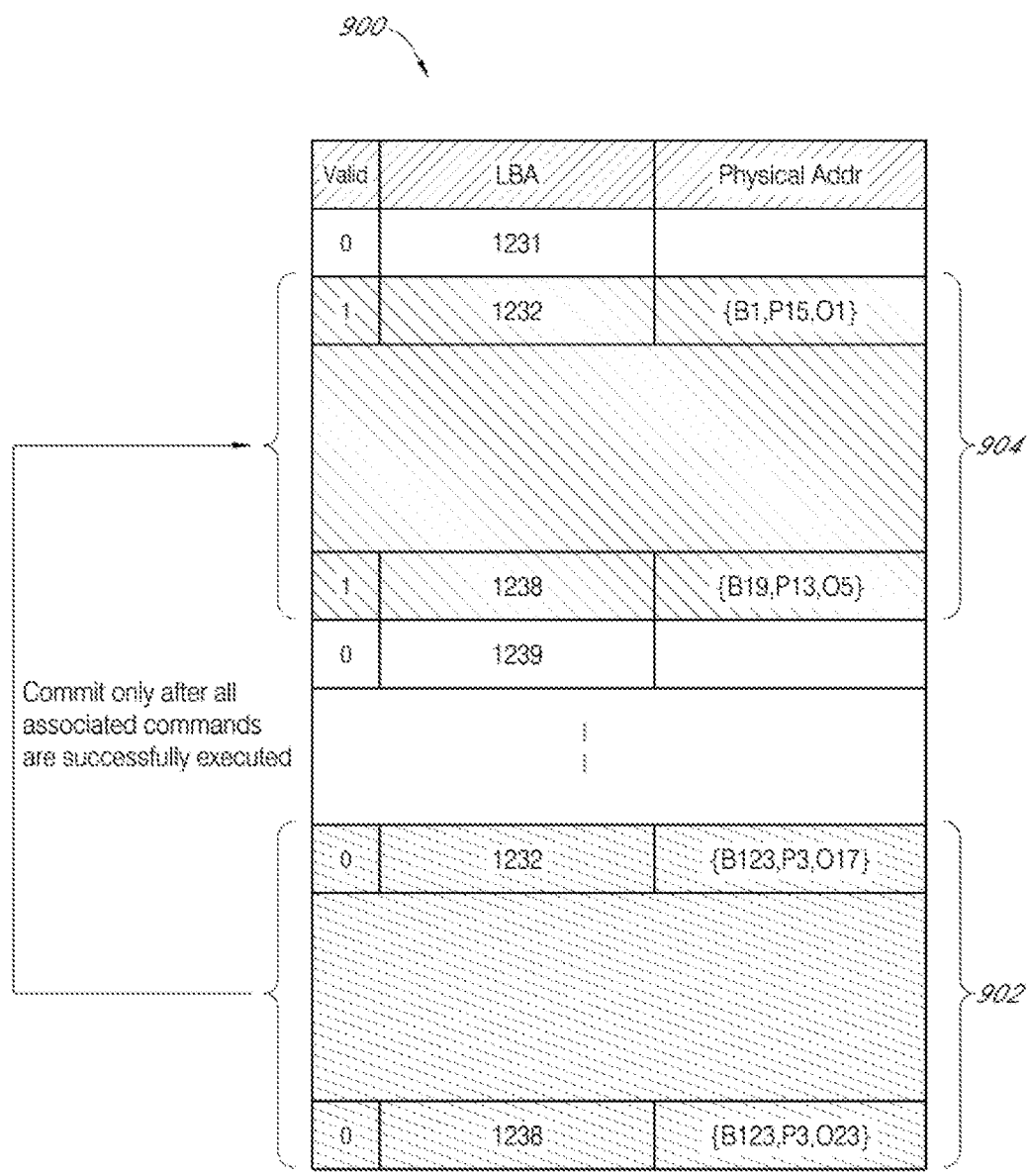
FIG. 9 illustrates the logical-to physical mapping performed at the end of the execution of an association group, according to some example embodiments of the present invention.

FIG. 9 illustrates the logical-to physical mapping 900 performed at the end of the execution of an association group, where the FTL (e.g., FTL 604) of the SSD controller (e.g., SSD controller 600) may program a newly modified data 902 for the associated LBAs (1232-1238) into a fresh, erased location 904 in the flash media (e.g., 608), and may update the logical-to-physical mapping tables to reflect new data corresponding to the original LBAs. Once a new or newly modified data 902 is written to the flash (e.g., 608), the SSD controller (e.g., SSD controller 600) sends a command completion back to the host device (e.g., host device 102). The SSD controller (e.g., SSD controller 600) subsequently updates the new logical-to-physical translation in the mapping table.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of a supply modulator for power amplifier have been specifically described and illustrated herein, many modifications and variations will be apparent to those skilled in the art. Accordingly, it is to be understood that a system and method for NVMe inter command association in SSD storage constructed according to principles of this invention may be embodied other than as specifically described herein. The invention is also defined in the following claims, and equivalents thereof.

What is claimed is:

1. A method comprising:
receiving, at a storage controller, a first command from a host device;
determining, at the storage controller, that the first command is part of an association group of commands by determining a first value of a first parameter of the first command in an association context table entry is greater than zero, the first parameter comprising a total number of commands in the association group of commands;
determining, at the storage controller, based on determining the first value of the first parameter of the first command in the association context table entry is greater than zero, a first value of a second parameter of the first command, the second parameter comprising a tag value identifying the association group of commands;
decrementing, by the storage controller, the first value of the first parameter of the first command in the association context table entry;
determining, by the storage controller, that the first value of the first parameter in the association context table entry is zero; and
executing, by the storage controller, based on determining the first value of the first parameter in the association context table entry is zero, an action indicated in a third parameter of the first command.

2. The method of claim 1, wherein the storage controller is associated with a storage device, wherein the storage device is a solid state drive (SSD) and the host device is a storage server.

3. The method of claim 1, wherein the first parameter of the first command is an association size (ASize) parameter, the second parameter of the first command is an association tag (ATag) parameter, and the third parameter of the first command is an association action (AAction) parameter.

4. The method of claim 3, wherein all commands in the association group of commands have same ATag value.

5. The method of claim 3, wherein AAction indicates a predefined action that the storage controller performs on all commands in the association group of commands.

6. The method of claim 1, wherein zero value of the first parameter in the association context table entry indicates an end of the association group of commands.

7. The method of claim 1, further comprising:
storing, by the storage controller, in the association context table in a storage device associated with the storage controller, the first value of the first parameter, the first value of the second parameter, and a first value of the third parameter of the first command.

8. The method of claim 1, wherein based on determining that the first value of the first parameter in the association context table entry is not zero, the method further comprises:
receiving, at the storage controller, a second command from the host device;
determining, at the storage controller, that the second command is part of the association group of commands by determining a second value of the first parameter of the second command in the association context table entry is greater than zero and a second value of the second parameter of the second command is same as the first value of the second parameter of the first command;
decrementing, by the storage controller, the second value of the first parameter of the second command in the association context table entry;
determining, by the storage controller, that the second value of the first parameter of the second command in the association context table entry is zero; and
executing, by the storage controller, based on determining the second value of the first parameter of the second command in the association context table entry is zero, an action indicated in the third parameter of the second command.

9. The method of claim 1, further comprising:
storing, by the storage controller, a data containing results from executing the action indicated in the third parameter of the first command, in a physical location in a storage device associated with the storage controller.

10. A system comprising:
a host device;
a bridge device connected to the host device at a first end of the bridge device; and
a storage device connected to the bridge device at a second end of the bridge device, wherein the bridge device is configured to:
receive a first command from the host device, wherein the first command is part of an association group of commands and a first parameter of the first command comprising a total number of commands in the association group of commands;
collect, from the host device, data related to the first command;
generate one or more second commands based on the first command received from the host device and the data related to the first command; and
transfer the one or more second commands to the storage device.

11. The system of claim 10, wherein the host device is a storage server and the storage device is a solid state drive (SSD).

12. The system of claim 10, wherein the bridge device generates the one or more second commands by dividing the first command received from the host device in a plurality of commands.

13. The system of claim 12, wherein the bridge device individually transfers each command of the plurality of commands to the storage device and wherein the bridge device is further configured to receive an indication from the storage device when execution of the one or more second commands is completed at the storage device.

14. The system of claim 13, wherein, in response to receiving the indication from the storage device, the bridge device is further configured to generate and transmit an indication to the host device that the execution of the one or more second commands are completed at the storage device.

15. A system comprising:
a host device;
a bridge device connected to the host device at a first end of the bridge device; and
a storage device connected to the bridge device at a second end of the bridge device, wherein the bridge device is configured to:
receive a first command from the host device;
collect, from the host device, data related to the first command;

generate one or more second commands based on the first command received from the host device and the data related to the first command; and transfer the one or more second commands to the storage device, wherein the bridge device generates the one or more second commands by dividing the first command received from the host device in a plurality of commands, wherein the plurality of commands is associated with each other and belongs to an association group of commands and wherein the bridge device inserts an association tag (ATag) and an association size (ASize) or a total number of commands in the association group of commands in each of the plurality of commands, wherein the ATag is same for all the commands in the association group of commands.

16. The system of claim 15, wherein the plurality of commands in the association group of commands form a linked list by each command in the association group of commands including at least a Command Identifier (CID) and/or a Submission Queue Id (SQID) to identify next command in the linked list to be executed by the storage device, wherein a last command in the linked list carries one or more fixed values reserved to indicate an end of the linked list.

17. The system of claim 15, wherein the bridge device is further configured to create a Command Identifier (CID) and a Submission Queue Identifier (SQID) tuple entries in a host memory buffer and send an address of the host memory buffer to a controller in the storage device in a third command, wherein the controller in the storage device receives command association group information during execution of the third command, and wherein the bridge device submits the plurality of commands in the association group of commands once the controller in the storage device completes execution of the third command.

18. The system of claim 10, wherein the bridge device collects the data related to the first command at a memory in the bridge device.

19. The system of claim 10, wherein the first command from the host device is a non-volatile memory (NVM) express (NVMe) or a NVMe over fabric (NVMe-oF) command.

20. A method comprising:

receiving, at a bridge device, a first command from a host device;

collecting, from the host device, data related to the first command;

generating, by the bridge device, an association group of commands including a plurality of commands by dividing the first command received from the host device in the plurality of commands;

inserting, by the bridge device, an association tag (ATag) and an association size (ASize) or a total number of commands in the association group of commands in each of the plurality of commands, wherein the ATag is same for all the commands in the association group of commands; and individually transferring, by the bridge device, each command of the plurality of commands to a storage device.

* * * * *